United States Patent [19]

Rayburn

[11] 4,127,890
[45] Nov. 28, 1978

[54] SINGLE PLEAT METALLIZED FILM CAPACITOR WITH SPRAYED EDGE TERMINATIONS

[75] Inventor: Charles C. Rayburn, Mt. Prospect, Ill.

[73] Assignee: Illinois Tool Works Inc., Chicago, Ill.

[21] Appl. No.: 814,945

[22] Filed: Jul. 12, 1977

[51] Int. Cl.² .......................................... H01G 1/147
[52] U.S. Cl. ................................. 361/309; 361/301; 361/304
[58] Field of Search ............... 361/301, 304, 303, 308, 361/309, 311

[56] References Cited

U.S. PATENT DOCUMENTS

| 2,470,826 | 5/1949 | McMahon | 361/301 |
| 2,919,390 | 12/1959 | Robinson | 361/301 X |
| 3,482,154 | 12/1969 | Robinson | 361/308 X |

FOREIGN PATENT DOCUMENTS 159,958  11/1954  Australia ............................ 361/301

*Primary Examiner*—E. A. Goldberg
*Attorney, Agent, or Firm*—Glenn W. Bowen; Robert W. Beart

[57] ABSTRACT

An electrical capacitor is formed utilizing a thin dielectric layer which is metallized on both sides to provide electrode areas. Unmetallized margin areas are provided on one side of the dielectric layer along the longitudinal edges of the layer, an unmetallized strip is provided in the center of the other side of the dielectric area which extends along the longitudinal dimension of the layer. The capacitor is formed by pleating, or folding, the dielectric layer once along its longitudinal dimension in the unmetallized central strip area slightly off of the center line of the dielectric layer, so that the unmetallized strip is on the inside of the pleat. The ends of the metallized dielectric layer which contain the unmetallized margin areas are thus staggered so that one end extends beyond the other.

8 Claims, 8 Drawing Figures

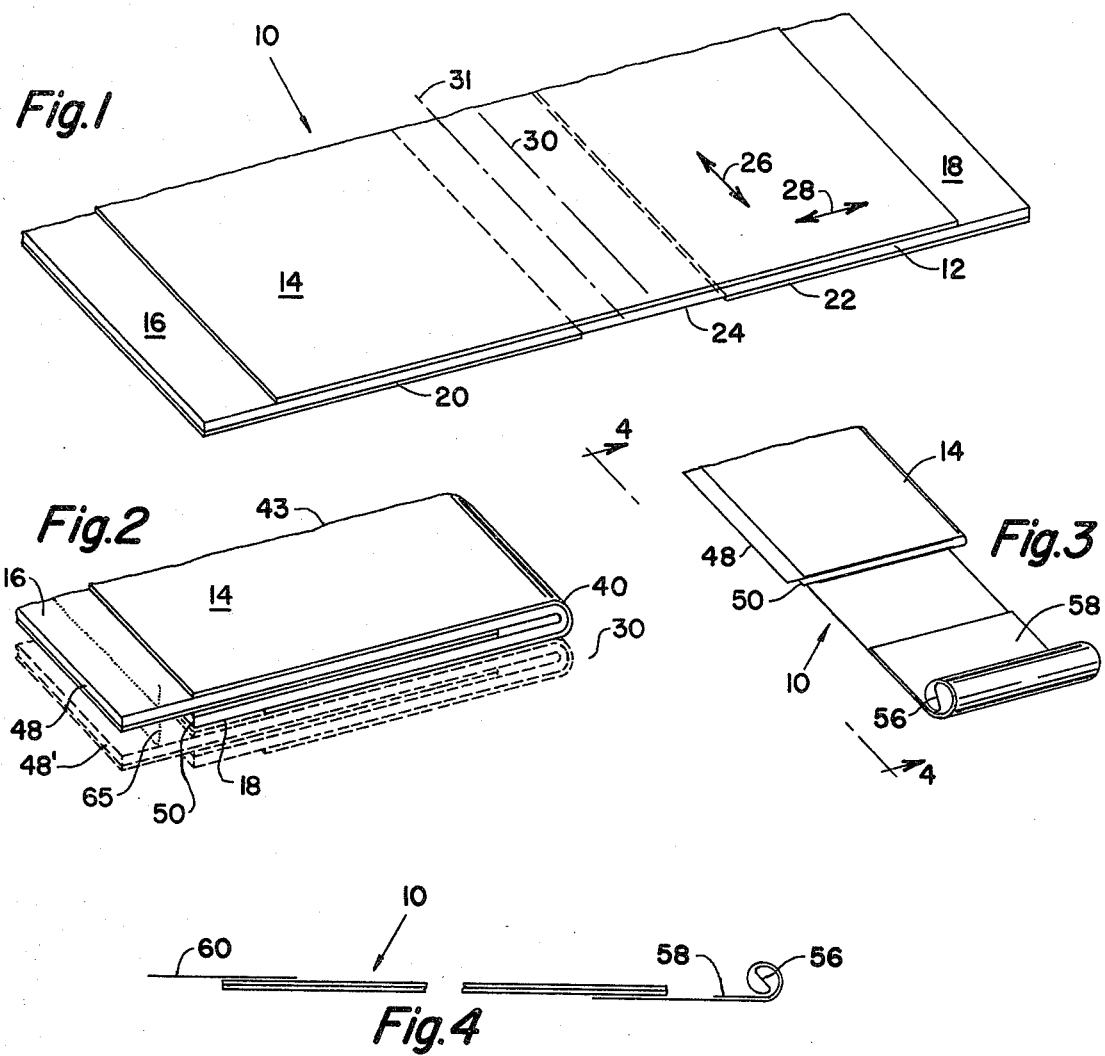
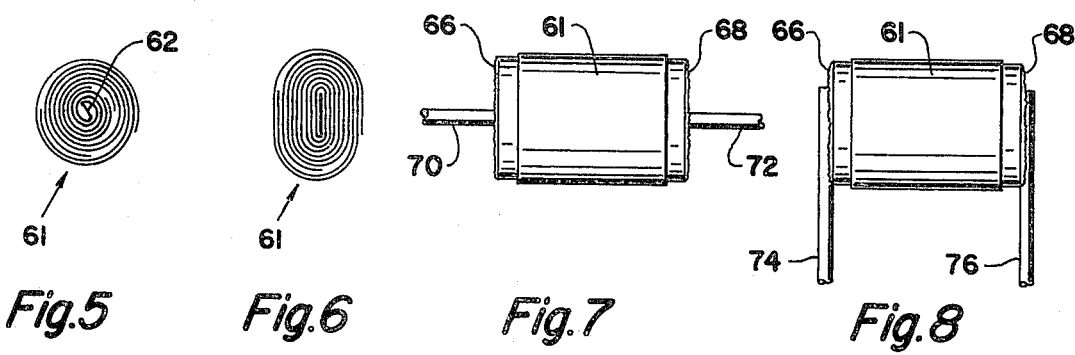

SINGLE PLEAT METALLIZED FILM CAPACITOR WITH SPRAYED EDGE TERMINATIONS

BACKGROUND OF THE INVENTION

Electrical capacitors made of thin film dielectric material which is metallized on both sides are used in large quantities in electrical devices because of their reliability, their desirable electrical characteristics and their relatively low cost. U.S. Pat. No. 2,470,826 issued on May 24, 1949 to W. McMahon illustrates a capacitor in which a double sides metallized dielectric layer is folded once in a longitudinal direction. The folded dielectric material may then be wound along its longitudinal dimension and electrical connections are made to the single pleated metallized dielectric layer of the McMahon patent by leads that are wound into the capacitor. The type of capacitor described by McMahon patent is extremely desirable because substantially all of the dielectric layer of the capacitor is in the electric field and the capacitor may be made without the insertion of an additional dielectric layer in the main body of the capacitor, although a short initial unmetallized dielectric strip and a protective terminating dielectric strip may be employed with the capacitor, if desired.

The type of capacitor construction that is envisioned by McMahon patent has a number of decided manufacturing and electrical advantages. For example, the problem of masking the dielectric layer during electrode evaporation when the electrode areas are applied to the film is substantially reduced. In addition, no slitting is required as it is during the manufacture of conventional wound film capacitors. Furthermore, the capacitance per unit dielectric area is maximized because of the substantially full use of the dielectric layer in the electric field, and, thus, shorter winding lengths per unit capacitance are required, thereby reducing the winding labor. Additionally, the capacitance lengths can be calibrated and pre-cut to produce a capacitor of more accurate values. Another advantage of this type of capacitor is that there are no air layers between the metallized electrodes and the pleated film surfaces and this increases the voltage at which corona discharge starts.

The McMahon patent suggested that leads could be attached to his pleated and wound capacitor by the well-known Schoop process when at least three pleats were employed. Actually, however, the application of high velocity metallic spray coatings to the edges of the capacitor described by McMahon is not commercially practical because metallic spray will penetrate through the dielectric area at a pleat, thereby shorting one electrode to the other. If the temperature and pressure of the spray are lowered, penetration of the dielectric layers may be reduced but the adhesion of the spray will generally be very poor. The type of multiple leads that were suggested in the McMahon patent that were wound into the capacitor also is not satisfactory since these leads tend to tear the dielectric material and they make the capacitor bulky and inductive.

In order to solve the above mentioned shorting problem at a pleated edge, it has been suggested in Australian Pat. No. 159,958, patented on Nov. 24, 1954 to provide unmetallized dielectric strips behind all of the pleats of a pleated metallized capacitor. The employment of an unmetallized strip behind the single pleated capacitor of the McMahon patent, however, still would not provide an end termination along the opposite edge of the wound capacitor segment that would allow a metallized spray to be applied to this edge because the ends of the dielectric layer of the McMahon patent at this edge extended beyond both of the metallized electrodes and contact between the metallic spray and the inner electrode area would thereby be prevented.

The configuration of the capacitor of the present invention provides a product which has all of the advantages of single pleated, or single pleated and wound, capacitors and also has the added advantage that it may be manufactured with commercially available metallized dielectric material. A further advantage of the present invention is that the same basic starting material may be used to manufacture capacitors having a number of different pleating combinations, which, of course, is not true for the capacitor of the Australian patent, in which each pleat combination requires a specially manufactured dielectric layer. In addition to the use of the present invention to manufacture wound film capacitors, it is also possible to utilize the invention to produce ceramic capacitors in which the capacitor dielectric material is folded while the ceramic material is still in a "green" state, in a manner similar to that disclosed in U.S. Pat. No. 3,223,494 issued Dec. 14, 1965 to J. W. Crownover.

DESCRIPTION OF THE DRAWINGS

The present invention is illustrated by reference to the drawings in which:

FIG. 1 is a perspective view of a portion of a metallized dielectric layer which may be used in the construction of the capacitor of the present invention;

FIG. 2 is a perspective view of a single pleated dielectric layer in accordance with the present invention;

FIG. 3 is a perspective view of the fully pleated dielectric layer of FIG. 2 which, in addition, shows a winding mandrel and an unmetallized dielectric insert;

FIG. 4 is a diagrammatic showing of the winding of a capacitor segment in accordance with the construction of FIG. 3;

FIG. 5 is an end view of a capacitor segment, before lead attachment, that is wound in accordance with the showing of FIGS. 3 and 4;

FIG. 6 is an end view of the wound capacitor segment of FIG. 5 after it has been pressed into an oval shape;

FIG. 7 is a side view of a completed capacitor following the attachment of axial leads; and FIG. 8 is a side view of a completed capacitor following attachment of radial leads.

TECHNICAL DESCRIPTION OF THE INVENTION

A portion of a commercially available metallized dielectric strip which may be unwound from a reel, that is suitable for a making of a capacitor in accordance with the present invention is shown in FIG. 1. The metallized dielectric strip is formed with a dielectric layer 12 of a thin film dielectric material, such as polyester, polypropylene, polystyrene, polycarbonate or other suitable material. A thin metallized electrode layer 14 is applied to the upper surface of the dielectric layer 12 in such a fashion that unmetallized margin areas 16, 18 extend along the longitudinal edges of the strip 10. Two thin metallized electrode areas 20, 22 are applied to the lower surface of the dielectric layer 12 so that the metallized layer 20 extends to the left hand margin of the layer as shown in FIG. 1, while the metallized layer 22 extends to the right hand margin of the layer. A central unmetallized strip 24 lies between the metallized electrode areas 20, 22.

In the embodiment shown in FIG. 1, the longitudinal dimension of the metallized strip 10 is shown along the arrows 26 while the narrow transverse dimension is shown along the arrows 28. This is to allow the capacitor to be pleated along the imaginary line 30 which extends through the length of the unmetallized central strip 24. The capacitor of the present invention, however, is not limited to one in which folding is along longitudinal lines since a capacitor could be made in accordance with the present invention by pleating along transverse lines if the appropriate corresponding metallized and unmetallized areas were provided.

A capacitor with a single pleat 40 along line 30 is shown in FIG. 2 which is slightly off of the center line 31 of the metallized strip 10 with the inside of the pleat 40 in the area being unmetallized. The longitudinal ends 48, 50 of the metallized strip 10 are arranged in a staggered pattern so that one end 48 extends beyond the other end 50 along the left hand longitudinal edge of the metallized strip because of the off-center pleat of the dielectric layer. The extension of the end 48 beyond the end 50 is preferably at least 0.020 inches, and this extension allows the metallic spray to make contact with at least the upwardly facing electrode area 22 shown in FIG. 2. The unmetallized margin 16 faces upwardly while the unmetallized margin 18 faces downwardly when the capacitor segment has been pleated as shown in FIG. 2.

After the capacitor has been processed to form the capacitor segment shown in FIG. 2, a number of different additional processing steps may be undertaken. For example, the pleated capacitor segment of FIG. 2 could be used to form a capacitor merely by spraying the right and left hand longitudinal edges of the segment with a metallized spray, such as babbitt or other suitable metal, in accordance with conventional practice, and then electrical leads could be secured to them, for example, by soldering. Alternately, the capacitor segment of FIG. 2 could be cut along a transverse line, such as the line 43, and a number of such segments could be stacked upon each other, with the terminal end 50 of one capacitor segment being adjacent to but not extending as far as the terminal end 48' of the capacitor segment that is positioned immediately below it, as shown diagrammatically by the dotted line representative of FIG. 2, and then their ends could be sprayed with a metallized spray and leads could then be secured to the stacked array of such segments. In conjunction with the presently preferred embodiment of the present invention, however, FIG. 2 represents two layers of a capacitor segment formed by winding of the dielectric strip about the longitudinal dimension of the strip 10, as shown in FIGS. 3 and 4, to form a wound capacitor. Another version of this capacitor could be achieved, however, by pleating the capacitor segment of FIG. 2 a number of times transversely along transverse fold lines, such as the line 43, or alternately, pleating several times and then completing the segment by winding the remainder of the length of the dielectric strip.

The winding of the capacitor segment of FIG. 2 into a wound capacitor may be achieved with various winding techniques, including the use of a split mandrel such as the mandrel 56 of FIGS. 3 and 4, which may be removed from the capacitor segment after it has been wound. An unmetallized dielectric strip 58 is desirably initially wound around the mandrel to protect the metallized electrode areas of the metallized strip 10. The winding of the capacitor segment then continues until it is almost completed, at which time an additional unmetallized dielectric strip 60 is then desirably wound into the structure to form an outer protective coating. The dielectric strip 60 may also be heat-sealed to itself to form the pleated capacitor segment 61 which is shown in FIG. 5. The removal of the mandrel 56 from the capacitor segment 61 leaves an opening 62 in the unit. The opening 62 may be closed by applying pressure, or pressure and heat in accordance with the type of dielectric layer used and conventional manufacturing techniques to the capacitor segment 61 so that it assumes an oval shape as shown in FIG. 6.

Once the capacitor segment of the embodiment of FIG. 3 through 6 has been wound, a metallized spray may then be directed against the longitudinal edges of the unit in accordance with conventional processing techniques to interconnect the electrode layers along these edges and to provide for the connection of electrical leads to the unit. The metallized spray will penetrate into the open area resulting from the staggering of the ends 48 and 50 on the left hand longitudinal edge of the capacitor segment, so that the inner electrode provided by the metallized areas 20, 22, is contacted by the sprayed metal particles, but so that the electrode layer 14 is not contacted by such particles, as indicated by the imaginary plane 65 which represents the maximum depth of penetration of the spray particles. The configuration of the present invention thus provides for reliable lead termination at the left hand longitudinal edge of the capacitor segment of FIG. 2 in a manner such that metallized end terminations may be employed with a single pleat metallized capacitor instead of bulky and inductive insert tab type of leads, as taught by the McMahon patent. Termination to the right hand longitudinal edge of the capacitor segment of FIG. 3 is similarly provided by a metallized spray which extends over the protruding center pleat 40 to a depth which is sufficient to allow the metallized spray to make good contact to the electrode area 14.

Once the metallic spray has been applied to the edges of the capacitor segment of FIG. 6, either radial or axial leads may be applied to it. For example, axial leads 70, 72 with conventional spiral "pigtail" ends (not shown) may be soldered, arc-welded or connected by other means to the sprayed edge termination layers 66, 68 at the ends of the wound film capacitor segment 61, as shown in FIG. 7. Alternately, radial leads 74, 76 may be soldered, arc-welded or connected by other methods to the sprayed metallized layers 66, 68 if a radial leaded capacitor is desired, as shown in FIG. 8.

What is claimed is:

1. An electrical capacitor segment comprising a dielectric layer having a center line, a first metallized electrode layer applied to one side of said dielectric layer so that an unmetallized margin extends along each edge of a pair of parallel edges of said dielectric layer, second and third metallized electrode layers applied to the other side of said dielectric layer so that a centrally located unmetallized strip runs between said second and third metallized layers, said dielectric layer being pleated once along said unmetallized center strip slightly off of said center line so that one edge of said margin containing edges extends beyond the other of said edges along the same end of said capacitor segment and a first metallized spray material in contact with only one of said second or third electrode layers at said same end of the segment, with said first electrode area having a second metallized spray material at the other end of the segment.

2. An electrical capacitor segment as claimed in claim 1, wherein a lead is secured to each of said metallized sprayed ends of said capacitor segment.

3. An electrical capacitor segment as claimed in claim 1, wherein said dielectric layer is an elongated layer and said capacitor segment is wound along the elongated dimension of said layer subsequent to said pleating once along a longitudinal line and said metallized sprayed material is applied to the ends of said capacitor after said winding has been completed.

4. An electrical capacitor segment as claimed in claim 3, wherein a lead is secured to each of said metallized sprayed ends of said capacitor segment.

5. An electrical capacitor segment as claimed in claim 3, wherein said dielectric layer is an elongated layer and said capacitor segment is pleated along lines transverse to the elongated dimension of said layer subsequent to said pleating along said longitudinal pleat line and said metallized sprayed material is applied to the ends of said capacitor after said transverse pleating has been completed.

6. An electrical capacitor segment as claimed in claim 5, wherein a lead is secured to each of said metallized sprayed ends of said capacitor segment.

7. An electrical capacitor comprising a plurality of capacitor segments that are stacked upon each other wherein each capacitor segment comprises a dielectric layer having a center line, a first metallized electrode layer applied to one side of said dielectric layer so that an unmetallized margin extends along each edge of a pair of parallel edges of said dielectric layer, second and third metallized electrode layers applied to the other side of said dielectric layer so that a centrally located unmetallized strip runs between said metallized layers, said dielectric layer being pleated once along said unmetallized strip slightly off of said center line so that one edge of said margin containing edges extends beyond the other of said edges along the same end of its associated capacitor segment and a first metallized spray material in contact with only one of said second or third electrode layers at the same end of the segments with said first electrode having a second metallized spray material at the other end of the segments.

8. An electrical capacitor segment as claimed in claim 7, wherein a lead is secured to each of said metallized sprayed ends of said capacitor segment.

* * * * *